US008655464B2

(12) United States Patent
Dollar, Jr.

(10) Patent No.: US 8,655,464 B2
(45) Date of Patent: Feb. 18, 2014

(54) ADAPTIVE PLAYLIST ONBOARD A VEHICLE

(75) Inventor: William A. Dollar, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 12/481,473

(22) Filed: Jun. 9, 2009

(65) Prior Publication Data

US 2010/0312369 A1   Dec. 9, 2010

(51) Int. Cl.
*G06F 17/00* (2006.01)
(52) U.S. Cl.
USPC .......................................................... 700/94
(58) Field of Classification Search
USPC ................. 700/94; 704/500–504; 455/3.06; 369/1–12
See application file for complete search history.

(56) References Cited

U.S. PATENT DOCUMENTS

| | | | |
|---|---|---|---|
| 7,343,384 B2 | 3/2008 | Plastina et al. | |
| 7,345,232 B2 | 3/2008 | Toivonen et al. | |
| 2002/0041692 A1* | 4/2002 | Seto et al. | 381/86 |
| 2003/0089218 A1* | 5/2003 | Gang et al. | 84/615 |
| 2004/0225519 A1* | 11/2004 | Martin | 705/1 |
| 2005/0021470 A1* | 1/2005 | Martin et al. | 705/51 |
| 2008/0133593 A1 | 6/2008 | Clark | |
| 2008/0189319 A1 | 8/2008 | Nielen et al. | |

OTHER PUBLICATIONS

Martin, "Mood Adaptive Playlists", Retrieved at http://martingrayson.co.uk/wordpress/?p=11>>, Apr. 1, 2009, pp. 1-2.

Liu, et al., "Adaptive Music Recommendation Based on User Behavior in Time Slot", Retrieved at http://paper.ijcsns.org/07_book/200902/20090229.pdf>>, IJCSNS International Journal of Computer Science and Network Security, vol. 9, No. 2, Feb. 2009, pp. 219-227.

Kaji, et al., "A Music Recommendation System Based on Annotations about Listeners' Preferences and Situations", Retrieved at <<http://ieeexplore.ieee.org//stamp/stamp.jsp?tp=&arnumber=01592092>>, Proceedings of the First International Conference on Automated Production of Cross Media Content for Multi-Channel Distribution, Apr. 1, 2009, pp. 4.

Oliver, et al., "PAPA: Physiology and Purpose-Aware Automatic Playlist Generation", Retrieved at <<http://ismir2006.ismir.net/PAPERS/ISMIR06162_Paper.pdf>>, In Proceedings of the 7th International Conference on Music Information Retrieval, pp. 4.

Reynolds, et al., "Towards a Personal Automatic Music Playlist Generation Algorithm: The Need for Contextual Information", Retrieved at <<http://eleceng.dit.ie/papers/56.pdf>>, pp. 1-6.

* cited by examiner

*Primary Examiner* — Andrew C Flanders
(74) *Attorney, Agent, or Firm* — Henry Gabryjelski; Kate Drakos; Micky Minhas (57) ABSTRACT

Systems and methods for generating an adaptive playlist on a computing device onboard a vehicle are provided. The system may include an onboard vehicle computing device configured to execute a media player program. The media player program may include a media storage module configured to store a plurality of media items, a user preference module having user media preferences, a contextual data module configured to receive dynamic contextual data from an onboard vehicle data source, and a playlist manager module. The playlist manager module may include a playlist generation engine configured to generate an adaptive playlist including user playlist media items, and a contextual media selection engine configured to select contextual media items based on the dynamic contextual data and interleave the selected contextual media items into the adaptive playlist.

18 Claims, 3 Drawing Sheets

ADAPTIVE PLAYLIST ONBOARD A VEHICLE

BACKGROUND

Media players, such as music players, are widely used for personal entertainment. Users of media players commonly create playlists for their media players, such that a queue of media items (e.g., songs, videos, podcasts etc.) can be played on the media player without further user intervention. However, once a user has created a media playlist, the content of that playlist may quickly become outdated or ill-suited for later play. As a result, a user may have cause to frequently create playlists, which can be time-consuming and lead to user frustration. This problem can be compounded for users of vehicle-based media players since the user may be occupied driving the vehicle, and thus not free to create new playlists or make changes to existing playlists.

SUMMARY

Systems and methods for generating an adaptive playlist on a computing device onboard a vehicle are provided. An exemplary system may include an onboard vehicle computing device configured to execute a media player program. The media player program may include a media storage module configured to store a plurality of media items, a user preference module having user media preferences, a contextual data module configured to receive dynamic contextual data from an onboard vehicle data source, and a playlist manager module. The media player program may further include a playlist manager module having a playlist generation engine configured to generate an adaptive playlist including user playlist media items, and a contextual media selection engine configured to select contextual media items based on the dynamic contextual data and interleave the selected contextual media items into the adaptive playlist.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
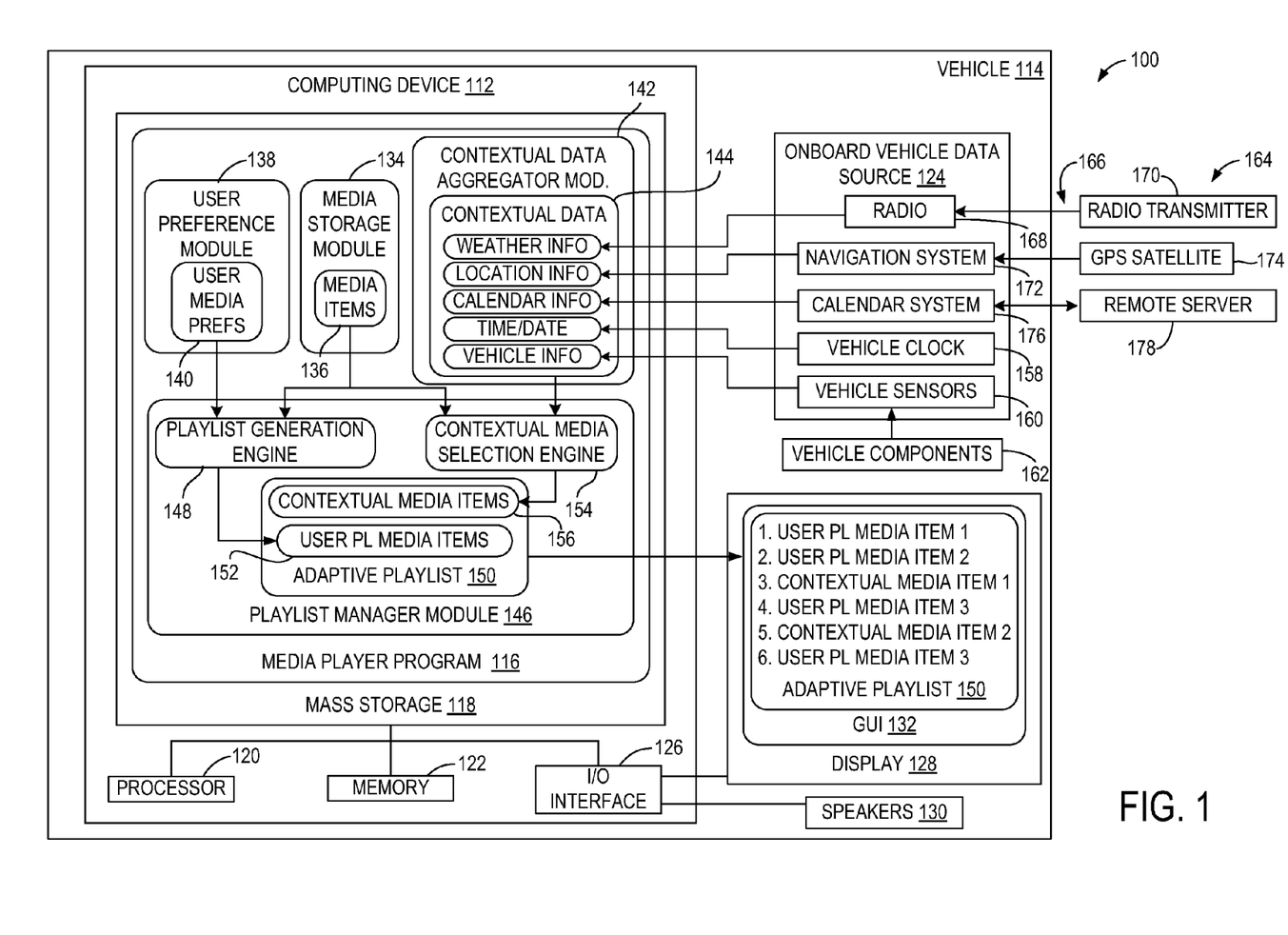
FIG. 1 is a schematic view of an embodiment of a system for generating an adaptive playlist on a computing device onboard a vehicle.

FIG. 1 is a schematic view of a system 100 for generating an adaptive playlist on a computing device onboard a vehicle. System 100 includes an onboard vehicle computing device 112 mounted in a vehicle 114. Computing device 112 is configured to execute one or more programs, such as media player program 116, stored in mass storage 118 using a processor 120 and portions of memory 122. Computing device 112 is configured to communicate with various devices onboard the vehicle 114, such as onboard vehicle data source 124, via an input/output interface 126. Computing device 112 also includes an associated display 128 for displaying a graphical user interface 132 of the media player program 116, and/or speakers 130 for emitting audio played by the media player program 116. It will be appreciated that computing device 112 may be incorporated within a head unit integrated within a vehicle, or may be added to the vehicle as an add-on device.

The media player program 116 may include a media storage module 134 configured to store a plurality of media items 136, a user preference module 138 having user media preferences 140, a contextual data aggregator module 142 configured to receive dynamic contextual data 144 from the onboard vehicle data source 124. Typically, the onboard vehicle data source 124 includes a plurality of different devices, and thus the contextual data aggregator module 142 is configured to receive dynamic contextual data 144 from each of these constituent devices, which are discussed in detail below.

The media player program 116 may also include a playlist manager module 146 including a playlist generation engine 148 configured to generate an adaptive playlist 150 including a plurality of user playlist media items 152 selected from the plurality of media items 136 based on the user media preferences 140. The playlist manager module 146 may also include a contextual media selection engine 154 configured to select one or more contextual media items 156 from the plurality of media items 136, based on the dynamic contextual data 144 received from the onboard vehicle data source 124. The contextual media selection engine 154 may also be configured to interleave the selected one or more contextual media items 156 into the adaptive playlist 150.

With such a configuration, programmatically generated playlists, as well as playlists created by the user, may be augmented with relevant, programmatically selected media items based on the contextual data determined from onboard vehicle data sources, without necessitating any tedious input by the user.

It will be appreciated that each media item of the plurality of media items 136 typically includes both playable audio or video data as well as metadata such as track data (e.g., track name, album name, track length, etc.), artist data, genre data, and/or tempo data. Other metadata such as lyrics, a textual description of the media subject matter, or holidays on which the track should be played, may also be included.

The user media preferences 140 may include track preferences (e.g., "Yellow Submarine"), artist preferences (The BEATLES), genre preferences (British Pop), tempo preferences (Up Tempo) and/or religious preferences (Secular), which respectively may indicate a user's expressed or measured preference for a particular track, artist, genre, tempo or religious category of music or other type of media item. In this manner the user's likes and dislikes can be represented in an organized manner that may be utilized to select other media items for inclusion in the adaptive playlist, as described below.

These user media preferences 140 may be inputted by the user, for example, via a feedback selector on graphical user interface 132 that enables the user to rate different media items at the time of playback. Alternatively or in addition, it will be appreciated that the user media preferences 140 may be based on historical listening patterns, which are measured over time based on a user's listening history. For example, the user media preferences 140 may be cumulatively weighted based on the historical listening patterns to indicate a user's historical preferences for various tracks, artists, genres, and tempos that have been listened to by the user over a period of time.

Although user media preferences 140 are shown as stored on the user preference module 138, the computing device 112 may alternately send a request to another computing device, server, or service for user media preferences and receive the user media preferences 140 responsive to such a request.

The playlist generation engine 148 may be configured to read the user media preferences 140, and select media items from the media storage module 134 that have matching characteristics stored in their metadata for inclusion as user playlist media items 152 in the adaptive playlist 150.

The contextual data 144 may further include one or more of weather information, location information, calendar information, time and date information, and vehicle information, illustrations of which are provided below, obtained from various onboard vehicle data sources. By utilizing these types of contextual data, meaningful correlations between the historical listening patterns of the user, and the variety of conditions represented by the contextual data 144 may be determined, and new media items may be selected for inclusion in the adaptive playlist 150 based on these correlations, as described below.

In one example, the onboard vehicle data source 124 includes a vehicle clock 158 configured to output the time and date information. Time and date information may be used, for example, to correlate a user's historical listening preferences during certain times of the days, days of the weeks, dates, etc. For example, historical listening patterns may be compared to historical contextual data by the contextual media selection engine, which on the basis of this comparison may compute that a user prefers news programs during a first predetermined time corresponding to a morning commute and pop music programs during a second predetermined time corresponding to an evening commute.

In another example, the onboard vehicle data source 124 includes vehicle sensors 160 configured to detect one or more operating conditions of vehicle components 162. By gathering contextual data from such vehicle sensors, the user's historical listening preferences may be correlated for a variety of vehicle operating conditions. Accordingly, media items may be selected for an adaptive playlist based on resulting correlation values, as one example.

Figure 3:
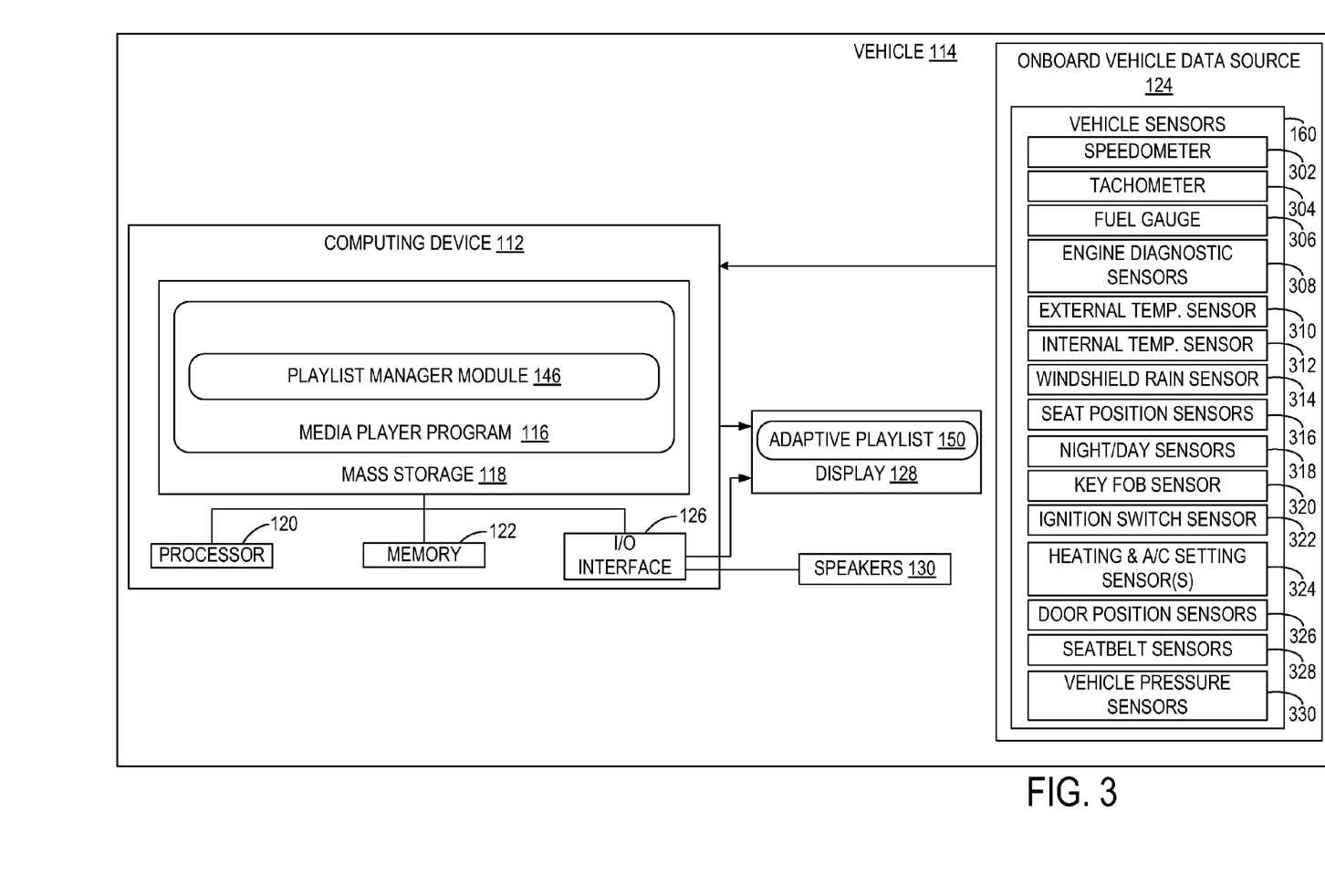
FIG. 3 is a schematic view of an embodiment of a system for generating an adaptive playlist on a computing device onboard a vehicle having a plurality of vehicle sensors.

As shown in FIG. 3, a variety of vehicle sensors 160 may be equipped on onboard vehicle data source 124 of vehicle 114. For example, the vehicle sensors 160 may include a speedometer 302, tachometer 304, fuel gauge 306, engine diagnostic sensors 308, external air temperature sensor 310, internal air temperature sensor 312, windshield rain sensor 314, driver and passenger seat position sensors 316, night and day sensors 318, key fob sensor 320, ignition switch sensor 322, heating and air conditioning setting sensors 324, door position sensors 326, seatbelt sensors 328, vehicle pressure sensors 330, etc.

Thus, an adaptive playlist may be updated based on vehicle or engine speed as indicated by the speedometer 302 and tachometer 304, respectively. Further, if there is a reportable engine diagnostic indicated by the engine diagnostic sensors 308, undesirable vehicle pressure (e.g., tire pressure) indicated by the vehicle pressure sensors 330, or a low fuel level as indicated by the fuel gauge 306, media items including video or audible warnings (e.g., "check engine", "put air in the tires", "get gas", etc.) may be added to an adaptive playlist to alert the vehicle occupants. Yet another example includes updating an adaptive playlist based on hot or cold conditions detected inside the vehicle from the internal temperature sensor 312 and/or based on temperature conditions detected outside the vehicle from the external temperature sensor 310. That is, media items (e.g., songs) that are generally enjoyed by users on cold days may be added to the adaptive playlist if the external temperature sensor 310 indicates sun and the air conditioning setting indicates the vehicle cabin is requesting air conditioning. If it is raining heavily as indicated by windshield rain sensor 314, the song "Singing in the Rain" may be added as a media item to an adaptive playlist. As another example, if a door is open as indicated by the door position sensors 326 or a driver seat belt is not latched as indicated by one of the seatbelt sensors 328, and there is someone in the driver seat (as indicated by one of the seat position sensors 316), an adaptive playlist may be updated to include a warning message instructing the vehicle occupant(s) to "close the door" and/or "latch the seat belt". Further still, one or more of the seat position sensors 316 may be able to identify the occupant of the seat (e.g., based on weight, seat position, etc.) and update an adaptive playlist based on that occupant's preferences.

Returning back to FIG. 1, for some types of onboard vehicle data sources, the dynamic contextual data 144 may be received at the onboard vehicle data source 124 from a remote data source 164 via a wireless communication link 166. This enables the system to utilize a wide variety of information that may be available via outside information sources. For example, the onboard vehicle data source may be a radio 168 and the wireless communication link 166 may be a radio broadcast signal from a transmitter 170. In this manner, the system may utilize nearly ubiquitous broadcast radio signals available using current radio broadcast infrastructure to obtain contextual information, even where network connectivity is unavailable. The radio may be configured to receive encoded high definition (HD) radio data and/or radio data system (RDS) data, for example, including the dynamic contextual data via the radio broadcast signal. By way of example, the contextual data encoded in the HD radio data and/or RDS data may include weather information, or information such as genre, title, artist, etc. of the currently broadcast radio track. By using HD or RDS technologies, various metadata may be efficiently extracted from currently available radio signals, and utilized by the embodiments of the system.

As another example, the onboard vehicle data source 124 may include a navigation system 172, and the wireless communication link 166 may be a global positioning system (GPS) link. The navigation system may be configured to receive signals from GPS satellite 174 via the global positioning system link and determine location information indicating a current position of the vehicle 114 and/or a route of travel of the vehicle 114. In some embodiments, the location information may also include information on traffic, points of interest, etc. in the vicinity of the vehicle location or route of travel. In this manner, the system 100 may obtain location information including vehicle location and/or vehicle travel route, and correlate such location information with historical listening preferences of the user, such that new media items with matching metadata may be selected for interleaving into the adaptive playlist when contextual data with similar location information is detected. Thus, the contextual media selection engine 154 may determine that the user prefers to listen to news programs when driving on a first identified travel route on a first roadway to work, and rock and roll when driving on a second identified travel route on a second roadway into the mountains near a ski resort.

As another example, the onboard vehicle data source 124 may include a calendar system 176 configured to store calendar information for the user. In some embodiments, the calendar system 176 may be configured to communicate via a wireless communication link 166 with a remote server 178, and receive calendar information from the remote server 178. In addition or in the alternative, the calendar system 176 may be configured to sync calendar information with a portable device of the user that is carried into the vehicle 114, such as a mobile telephone. The calendar information may include personal calendar entries, national holidays, religious and cultural holidays, as well as shared calendar entries for any shared calendars to which the user subscribes. The calendar information may include metadata on the nature of each calendar entry, as well as date and time information indicating the date and time of the calendar entry. Based on such calendar information, the contextual media selection engine 154 may be configured to find media items with matching metadata, for inclusion in the adaptive playlist 150.

As briefly mentioned previously, the contextual media selection engine 154 is configured to track contextual data history over time and store a contextual data history based on this tracking. In a preprocessing step, or continuously over time, the contextual media selection engine 154 is further configured to determine correlations between the contextual data history and the historical listening preferences in the user media preferences 140. As current contextual data is received at the contextual media selection engine 154, the contextual media selection engine 154 is configured to select media items 136 for inclusion as contextual media items 156 in adaptive playlist 150, based on determined correlations between historical listening preferences in user media preferences 140 and the historical contextual data matching the current contextual data 144. In this manner, the contextual media selection engine 154 can determine user media preferences expressed under various conditions. As new contextual data is received, the contextual media selection engine 154 can examine the correlations and determine user media preferences 140 for similar contextual data, and then select appropriate media items for inclusion as contextual media items 156 in the adaptive playlist 150.

As discussed above, the computing device includes a display 128 for displaying the adaptive playlist 150 and/or speakers 130 for playing the adaptive playlist 150. Thus, once the adaptive playlist 150 is generated by the playlist generation engine 148, and contextual media items 156 are interleaved by the contextual media selection engine 154, the adaptive playlist 150 may be displayed via graphical user interface (GUI) 132 on display 128, and/or played on speakers 130, thereby enabling a user to visually inspect, watch, and/or listen to the adaptive playlist 150 itself, and the media items as they are played from the playlist queue.

It may be appreciated that the illustrated sources of the various types of contextual data described herein are merely exemplary. For example, the computing device 112 may include mobile telephone functionality and the weather information may be received from a remote server rather than radio signals, the location information may be determined from mobile phone tower signals, and some forms of calendar information, such as holiday, school closure, or other information may be received via radio broadcasts.

Contextual data 144 may be continuously or periodically received at the media player program 116 of the computing device 112. In some examples, dynamic contextual data 144 may be received at a predetermined time interval, and/or responsive to a vehicle event, such as an engine start, or engine re-start.

It will be appreciated that the particular arrangement of programs and constituent modules described herein is merely exemplary, and that other software architectures may be used to achieve similar functions. For example, although shown as stored in a contextual data aggregator module 142 on the computing device 112 in this example, the dynamic contextual data 144 may be stored elsewhere on the computing device 112, or on another computing device. Further, while the playlist generation engine 148 and contextual media selection engine 154 are shown as two separate modules, it will be appreciated that the functions achieved by these modules may be alternatively achieved by one module or more than two modules, executed on the computing device 112, or on another computing device in communication with the computing device 112.

By providing systems and methods as described above in which digital media items can be selected for inclusion in an adaptive playlist 150 based on dynamic contextual data 144, a resultant adaptive playlist may more accurately match a user's desires at any given time or circumstance. This may add variety to the user's listening experience, and indeed may anticipate a user's mood and media preferences, without necessitating burdensome user input to modify or create an existing playlist. Below, various particular use scenarios will be described illustrating the utility of the systems and methods described herein.

Use Case Scenarios

For example, if media items are selected to relate to a user's particular location, the user may more likely enjoy the items. As a specific example, if the user is travelling through a rural area, he or she may more likely enjoy country music. Thus, playlist media items 136 may be selected to include country music songs as these "match" the user's dynamic contextual data. Further still, geographical points of interest that are nearby, or on a route of travel of the vehicle 114 can be included with the location information. For example, if the computing device 112 receives location information indicating a nearby college, the college radio station may be selected as one of the contextual media items 156 for inclusion in the adaptive playlist 150. Further, if the computing device 112 receives location information indicating the vehicle 114 is on a travel route toward Washington D.C., political talk radio may be selected for inclusion in the adaptive playlist 150.

Another technique for selecting playlist media items 136 for the adaptive playlist 150 includes computing a matching value between a media item and dynamic contextual data 144, and selecting a media item for inclusion in the adaptive playlist 150 if the matching value exceeds a matching threshold. For example, a matching value between a pop-genre song in the media items 136 may be compared to the dynamic contextual data 144 including location information indicating the computing device 112 is near a beach. Such a matching value between the pop-genre song and the location information may be high, and thus the pop-genre song may be selected for inclusion in the adaptive playlist 150.

The matching values may be computed based on a common keyword in the digital media item and the dynamic contextual data. For example, a keyword of "sun" in the title or metadata associated with a digital media item may have a high matching value with dynamic contextual data including the keyword "sun", for example, in the weather information. Furthermore, the matching values may be dependent on a likelihood or statistical probability that the user of the computing device 112, similar users of other computing devices, or all users of all computing devices, will enjoy that digital media item while experiencing that particular dynamic contextual data. For example, it may be determined that "You are my Sunshine" has a high matching value with weather information indicating a sunny day, and that this song is typically enjoyed by users on sunny days. Thus, "You are my Sunshine" may be included in the adaptive playlist 150.

As another example, media items may be selected for inclusion as contextual media items 156 based on traffic information, indicating traffic conditions for a particular location and roadway. In this way, music, or other audio or video entertainment that is typically enjoyed by that user, or other users during particular traffic conditions (e.g., "traffic congestion") can be selected for the adaptive playlist 150, using the matching techniques described above.

In addition or in the alternative to the matching techniques described above, selecting media items for inclusion as contextual media items 156 in adaptive playlist 150 may include ranking a plurality of candidate contextual media items 156 based on relative matching values, and selecting the candidates in order of highest rank.

As another example illustration of selecting media items for inclusion as contextual media items 156 based on contextual data 144, wedding music may be selected from the media storage module 134 for inclusion in the adaptive playlist 150 when the dynamic contextual data 144 received at the contextual media selection engine 154 includes calendar information indicating that a user's wedding anniversary is upcoming. Similarly, if the calendar information indicates that it is a user's birthday, a birthday-related song (e.g., "Happy Birthday") in a style, or genre, so as to match a user's favorite music genre, could be added to the adaptive playlist 150.

Further, the media player program 116 may include code for executing instructions to remove the birthday-themed songs from the adaptive playlist 150 when the calendar information indicates the user's birthday has passed and/or after a predetermined number of plays of the song has occurred. In this way, media items that are most relevant to a user can be selected for play with minimal, or no user intervention.

Figure 2:
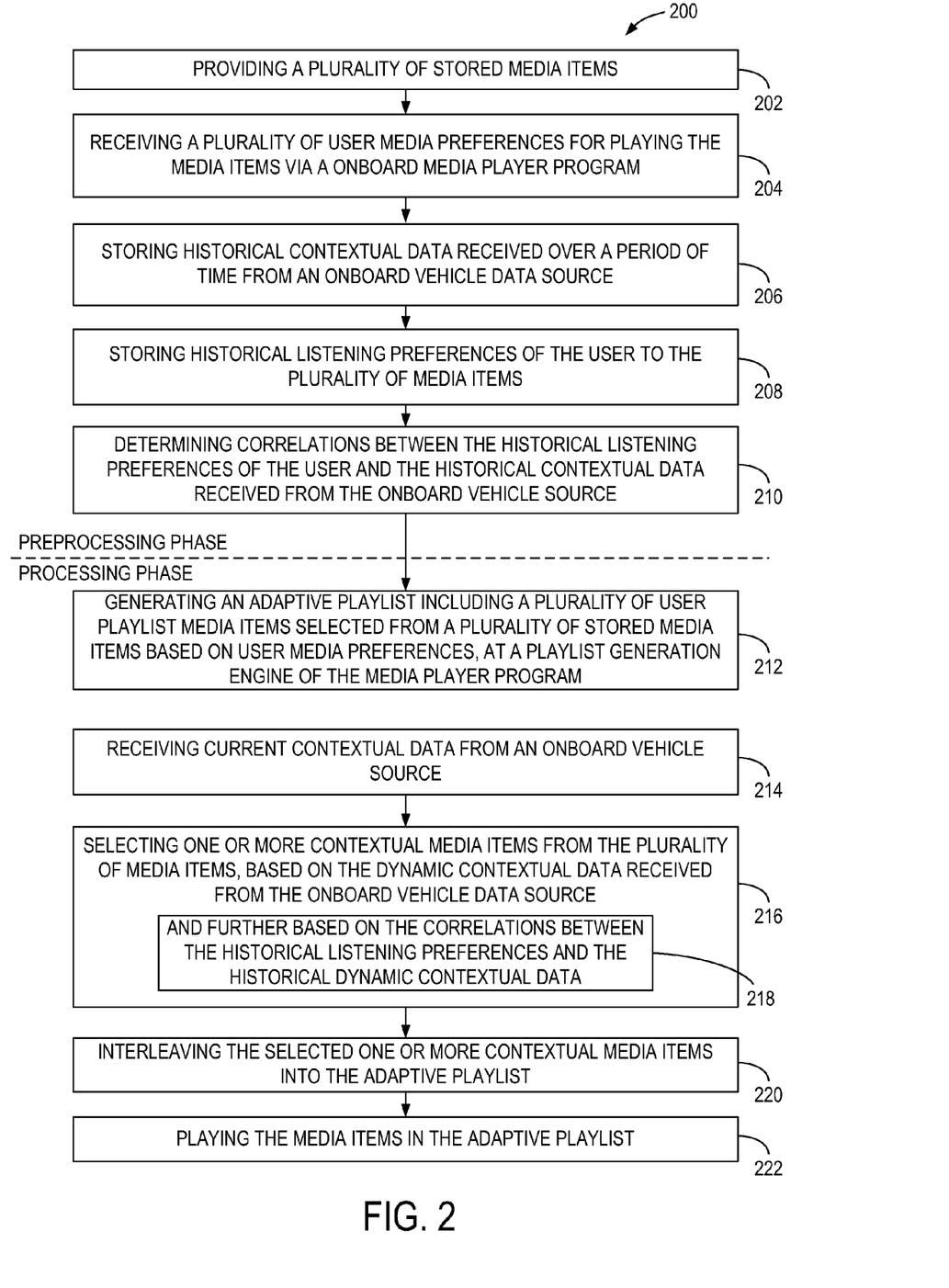
FIG. 2 is a flowchart illustrating an exemplary method for generating an adaptive playlist on a computing device.

Referring now to FIG. 2, a flowchart illustrates an exemplary method 200 for generating an adaptive playlist for a media player program executed on an onboard vehicle computing device. It will be appreciated that the method 200 may be implemented using a hardware configuration such as the system described above with respect to FIG. 1, or using other suitable hardware configurations.

Method 200 includes a preprocessing phase including steps 202-210 and a processing phase including steps 212-222, as described below. At 202, the method 200 may include providing a plurality of stored media items. The media items may be stored, for example, at a media storage module of the media player program executed on the onboard vehicle computing device. At 204, the method may further include receiving a plurality of user media preferences for playing the media items via an onboard media player program. The user media preferences may be received, for example, at a user preference module of the media player program. The user media preferences may include, for example, one or more of a track preference, a genre preference, an artist preference, a media preference, or a religious preference, and are based on historical listening patterns of the user, as described above. As discussed above, this enables the user's likes and dislikes to be represented in an organized manner that may be utilized to select other media items for inclusion in the adaptive playlist, as described below.

At 206, the method 200 may include storing historical contextual data received over a period of time from an onboard vehicle data source. The historical contextual data may be stored, for example, at a contextual media selection engine module of the media player program. The historical contextual data may include one or more of location information, weather information, calendar information, time and date information, and vehicle data, as described above. The onboard contextual onboard vehicle data source may, for example, include a radio, a navigation system, a calendar system, a vehicle clock and/or a vehicle sensor. By using data sources resident on the vehicle, the method 200 may leverage data sources already resident on many vehicles without complicated reengineering of these data sources, thereby reducing cost, while at the same time providing a rich variety of information about the vehicle context. In some embodiments, the onboard vehicle data sources may be able to communicate with remote data sources and thus, the dynamic contextual data may be received at the onboard vehicle data source from a remote data source via a wireless communication link, thereby further enhancing the variety and timeliness of information available to the onboard vehicle data sources.

At 208, the method may include storing historical listening preferences of the user to the plurality of media items. The historical listening preferences may be stored, for example, at a user preference module of the media player program. By tracking these types of historical contextual data, meaningful correlations between the historical listening patterns of the user, and the variety of conditions represented by the contextual data may be determined, and new media items may be selected for inclusion in the adaptive playlist based on these correlations, as described below. At 210, the method may include determining correlations between the historical listening preferences of the user and the historical contextual data received from the onboard vehicle source. This determination may be made, for example, at the contextual media selection engine.

Turning now to the processing phase, it will be appreciated that this phase may represent run-time of a media player program as the user is traveling in the vehicle. At 212, the method 200 may include generating an adaptive playlist including a plurality of user playlist media items selected from a plurality of stored media items based on user media preferences. This may occur, for example, at a playlist generation engine of the media player program. At 214, the method 200 may include receiving current contextual data from an onboard vehicle source. This may occur, for example, at a contextual data aggregator module of the media player program. The current contextual data may include one or more of weather information, location information, calendar information, time and date information, and vehicle data, as described above. At 216, the method 200 may further include selecting one or more contextual media items from the plurality of media items, based on the dynamic contextual data received from the onboard vehicle data source. In some embodiments, as illustrated at 218, selecting at 216 may further be based on the correlations between the historical listening preferences and the historical dynamic contextual data. Thus, in some embodiments, it will be appreciated that the contextual media selection engine may be configured to select media items based on determined correlations between historical listening preferences and historical contextual data matching the current contextual data. Steps 216 and 218 may be performed, for example, at the contextual media selection engine.

At 220, the method may include interleaving the selected one or more contextual media items into the adaptive playlist. The interleaving may be performed, for example, at the contextual media selection engine. At 222, the method may include playing the media items in the adaptive playlist. The playing may be performed via an output device including a display and/or a speaker, for example.

By using such a method, adaptive playlists may be generated that include interleaved media items that have been selected based on contextual data from a set of media items maintained on the computing device. In this way, a playlist may be kept fresh and interesting to the user, while being relevant to the context the user is experiencing in the vehicle. Further, this may be achieved without necessitating user-supplied input to modify or create a new playlist.

It will be appreciated that while user input is not necessitated, in some embodiments, the user may specify via user input various parameters that affect the generation of the adaptive playlist, such as preferred criterion or online information sources for selecting media items for inclusion as contextual media items in the adaptive playlist.

It will be appreciated that the order in which the steps of method 200 are described are merely illustrative, and the steps may be performed in another suitable order. Further, the modules in which they are performed may be located on one computing device or on several distributed computing devices.

Further, it will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory devices, and are configured to execute programs stored in non-volatile memory devices using portions of volatile memory and the processor.

As used herein, the term "program" refers to software or firmware components that may be executed by, or utilized by, one or more computing devices described herein, and is meant to encompass individual or groups of executable files, data files, libraries, drivers, scripts, database records, etc. Thus, the methods described herein can be performed by running a program that is stored on a computer-readable medium. It will be appreciated that computer-readable media may be provided having program instructions stored thereon, which upon execution by a computing device, cause the computing device to execute the methods described above and cause operation of the systems described above. Computer-readable media may include a memory device such as random-access memory (RAM), read-only memory (ROM), a hard disk, a compact disc (CD), digital video disc (DVD), etc. Some or all of the modules described herein may be software modules or hardware components, such as memory devices.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for generating an adaptive playlist on a computing device onboard a vehicle, the system comprising:
    an onboard vehicle computing device configured to execute a media player program, the media player program including:
        a media storage module configured to store a plurality of media items;
        a user preference module having user media preferences for a user;
        a contextual data module configured to receive in real-time, while the vehicle is moving, dynamic contextual data from an onboard vehicle data source, wherein the dynamic contextual data includes calendar information of the user received at the onboard vehicle data source from a user account at a remote data source via a wireless communication link, the calendar information comprising one or more of personal calendar entries of the user, shared calendar entries for a shared calendar to which the user subscribes, and synced calendar entries from a synced calendar maintained on a portable device associated with the user; and
        a playlist manager module including:
            a playlist generation engine configured to generate an adaptive playlist including a plurality of user playlist media items selected from the plurality of media items based on the user media preferences; and
            a contextual media selection engine configured to track and store the dynamic contextual data history over time, correlate the dynamic contextual data history with the user media preferences, select in real-time, while the vehicle is moving, one or more of contextual media items from the plurality of media items, based on the dynamic contextual data including the calendar information received at the onboard vehicle data source from the remote data source, and to interleave in real-time, while the vehicle is moving, the selected one or more contextual media items into and/or remove in real-time, while the vehicle is moving, the selected one or more contextual media items from the adaptive playlist.

2. The system of claim 1, where the user media preferences include one or more of a track preference, a genre preference, an artist preference, a media preference, or a religious preference, and are based on historical listening patterns of the user.

3. The system of claim 2, where the dynamic contextual data further includes one or more of travel route location information, weather information, time and date information, and vehicle data.

4. The system of claim 3, wherein the contextual media selection engine is configured to select media items based on determined correlations between the historical listening preferences and historical contextual data matching current contextual data.

5. The system of claim 3, where the onboard vehicle data source includes a vehicle clock configured to output the time and date information.

6. The system of claim 3, where the onboard vehicle data source includes a vehicle sensor configured to detect an operating condition of a vehicle component.

7. The system of claim 6, where the vehicle sensor is selected from the group comprising a speedometer, a tachometer, a fuel gauge, an engine diagnostic sensor, an external air temperature sensor, an internal air temperature sensor, a windshield rain sensor, a seat position sensor, a night and day sensor, a key fob sensor, an ignition switch sensor, a heating and/or air conditioning setting sensor, a door position sensor, a seatbelt sensor, and a vehicle pressure sensor.

8. The system of claim 3, where the onboard vehicle data source includes a radio configured to receive a radio broadcast signal from a transmitter, and the radio is configured to receive encoded HD radio data and/or RDS data including the dynamic contextual data via the radio broadcast signal.

9. The system of claim 8, where the dynamic contextual data encoded in the HD radio data and/or RDS data includes weather information.

10. The system of claim 3, where the onboard vehicle data source includes a navigation system configured to receive signals from global positioning satellite via a global positioning system link, and determine the current location information indicating a current position of the vehicle.

11. The system of claim 1, where the computing device further includes a display for displaying the adaptive playlist and/or a speaker for playing the adaptive playlist.

12. The system of claim 1, where the dynamic contextual data is received at the contextual data module at a predetermined time interval, and/or responsive to a vehicle event.

13. A method for generating an adaptive playlist for a media player executed on an onboard vehicle computing device of a vehicle, the method comprising:
generating an adaptive playlist including a plurality of user playlist media items selected from a plurality of stored media items based on user media preferences for a user; and
receiving in real-time, while the vehicle is moving, current contextual data from an onboard vehicle data source, wherein the current contextual data includes calendar information of the user received at the onboard vehicle data source from a user account at a remote data source via a wireless communication link, the calendar information comprising one or more of personal calendar entries of the user, shared calendar entries for a shared calendar to which the user subscribes, and synced calendar entries from a synced calendar maintained on a portable device associated with the user;
tracking and storing the current contextual data history over time, and correlating the current contextual data history with the user media preferences;
selecting in real-time, while the vehicle is moving, one or more contextual media items from the plurality of media items, based on dynamic contextual data including the calendar information received at the onboard vehicle data source from the remote data source;
interleaving in real-time, while the vehicle is moving, the selected one or more contextual media items into the adaptive playlist;
removing in real-time, while the vehicle is moving, the selected one or more contextual media items from the adaptive playlist;
playing the media items in the adaptive playlist via an output device.

14. The method of claim 13,
wherein generating the adaptive playlist is performed at a playlist generation engine of a media player program executed on an onboard vehicle computing device;
wherein receiving in real-time, while the vehicle is moving, current contextual data from the onboard vehicle data source is performed at a contextual data aggregator module executed on the onboard vehicle computing device; and
wherein selecting in real-time, while the vehicle is moving, the one or more contextual media items, interleaving in real-time, while the vehicle is moving, the selected one or more contextual media items, and removing in real-time, while the vehicle is moving, the selected one or more contextual media items are performed by a contextual media selection engine executed on the onboard vehicle computing device.

15. The method of claim 13, wherein the user media preferences include one or more of a track preference, a genre preference, an artist preference, a media preference, or a religious preference, and are based on historical listening patterns of the user.

16. The method of claim 15, where the dynamic contextual data further includes one or more of travel route location information, weather information, time and date information, and vehicle data.

17. The method of claim 14, wherein the contextual media selection engine is configured to select media items based on determined correlations between historical listening patterns and historical contextual data matching the current contextual data.

18. A method for generating an adaptive playlist for a media player program executed on an onboard vehicle computing device, the method comprising:
in a preprocessing phase:
providing a plurality of media items stored, at a media storage module of the media player program;
receiving a plurality of user media preferences for a user for playing the media items via an onboard media player program, at a user preference module of the media player program;
tracking and storing historical contextual data received over a period of time from an onboard vehicle data source, at a contextual media selection engine module;
tracking and storing historical listening preferences of the user to the plurality of media items, at a user preference module of the media player program; and
determining correlations between the historical listening preferences of the user and the historical contextual data received from the onboard vehicle data source, at the contextual media selection engine module; and
in a processing phase:
generating an adaptive playlist including a plurality of user playlist media items selected from the plurality of stored media items based on the plurality of user media preferences, at a playlist generation engine of the media player program;
receiving in real-time, while the vehicle is moving, current contextual data from the onboard vehicle data source, wherein the current contextual data includes, at a contextual data aggregator module of the media player program, calendar information of the user received at the onboard vehicle data source from a user account at a remote data source via a wireless communication link, the calendar information comprising one or more of personal calendar entries of the user, shared calendar entries for a shared calendar to which the user subscribes, and synced calendar entries from a synced calendar maintained on a portable device associated with the user;
selecting in real-time, while the vehicle is moving, one or more contextual media items from the plurality of media items, based on dynamic contextual data including the calendar information received at the onboard vehicle data source from the remote data source and the correlations between the historical listening preferences and the historical dynamic contextual data, at the contextual media selection engine module of the media player program;
interleaving in real-time, while the vehicle is moving, the selected one or more contextual media items into and/or removing in real-time, while the vehicle is moving, the selected one or more contextual media items from the adaptive playlist, at the contextual media selection engine module; and playing the media items in the adaptive playlist via an output device including a display and/or a speaker.

* * * * *